Figure 1:
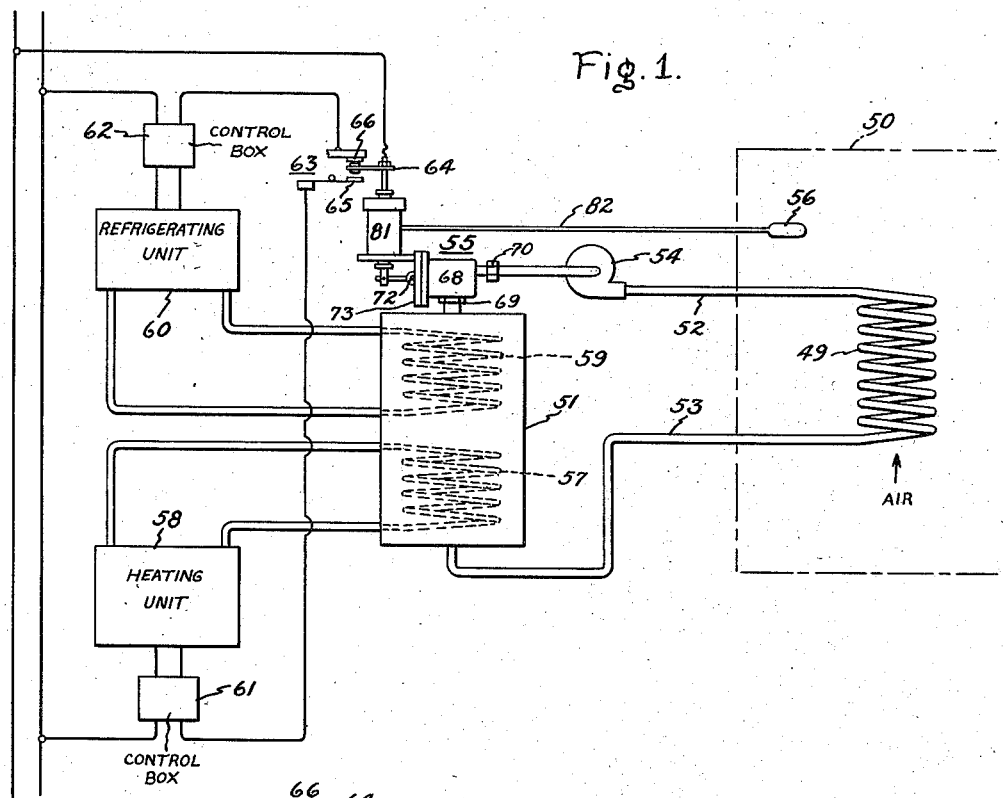

May 29, 1951 W. A. SPOFFORD 2,555,012
FLUID FLOW CONTROL SYSTEM AND VALVE THEREFOR
Filed March 28, 1949

Inventor:
Warren A. Spofford,
by William G. Edwards, Jr.
His Attorney.

Patented May 29, 1951

2,555,012

UNITED STATES PATENT OFFICE 2,555,012

FLUID FLOW CONTROL SYSTEM AND VALVE THEREFOR

Warren A. Spofford, Glen Ridge, N. J., assignor to General Electric Company, a corporation of New York Application March 28, 1949, Serial No. 83,860

2 Claims. (Cl. 257—3)

My invention relates to fluid flow control systems and devices and particularly to valves for effecting a control of fluid in two different ranges of operation. This application is a continuation-in-part of my abandoned application Serial No. 749,206, filed May 20, 1947, and assigned to the same assignee.

In fluid flow control systems, and particularly those employing a heat transfer fluid, it is sometimes desirable to control the flow of fluid in two different ranges of control conditions.

For example, one system of the type under consideration is a heating and cooling system wherein a single circuit is employed for supplying both heating and cooling fluid to a heat exchanger and which includes heating and cooling apparatus which may be employed selectively to provide the desired temperature of the heat transfer medium. In a system of this type the valve for controlling the circulation of the heat transfer medium must be controlled to open the valve on a rise in temperature during the cooling period and to close the valve on a rise in temperature during the heating period. Thus it is necessary to actuate the valve in opposite directions with respect to temperature change within the two ranges of operation. Furthermore, when the valve is controlled in accordance with the required conditions in the heating and cooling range, it is, of course, necessary that heating fluid be supplied to the system during the heating range and cooling fluid during the cooling range.

Accordingly, it is an object of my invention to provide a combined heating and cooling system including an improved fluid flow controlling valve which provides normal flow controlling functions during both the heating and cooling operations.

It is another object of my invention to provide a heating and cooling system employing a single heat transfer fluid and including an improved arrangement for effecting control of the circulating fluid both in the heating and cooling ranges and for assuring a supply of fluid at the required temperature during each range.

Further objects and advantages of my invention will become apparent as the following description proceeds, and the features of novelty which characterize my invention will be pointed out with particularity in the claims annexed to and forming a part of this specification.

Briefly, in the illustrated embodiment of my invention a control valve is provided in a heating and cooling system and is arranged to be responsive to the temperature of the space to be conditioned. The valve is actuated by two pressure actuated bellows arranged so that both bellows are subjected to a pressure corresponding to that temperature. During the operation of this embodiment, the first bellows controls the supply of heat transfer fluid during the cooling period, and the second bellows overcomes the first bellows and controls the supply of heating fluid during the heating season, it being understood that the temperature range during the cooling season is higher than that during the heating season. A further feature of this embodiment of my invention is the provision of a control effected in accordance with operation of the second bellows for insuring the supply of heating fluid during the heating season and cooling fluid during the cooling season.

Figure 2:
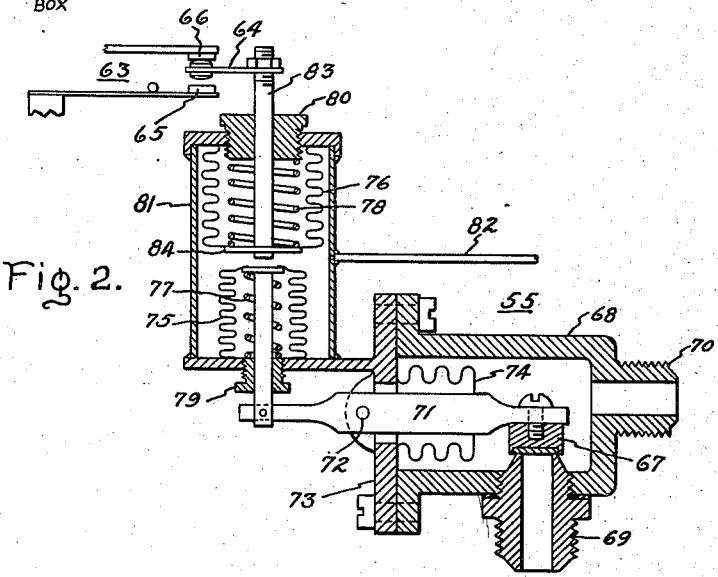

For a better understanding of my invention reference may be had to the accompanying drawing in which Fig. 1 is a diagrammatic illustration of a heating and cooling system embodying my invention; and Fig. 2 is an enlarged sectional view of the control valve employed in the system of Fig. 1.

Referring now to the drawing, the heating and cooling system illustrated in Fig. 1 comprises a suitable coil or other heat transfer unit 49 arranged in an enclosure to be conditioned indicated by the dot-dash line 50 and arranged to be supplied with heat transfer fluid from a tank 51 through inlet and discharge conduits 52 and 53 respectively. The heat transfer liquid employed in the system may be water or any other suitable liquid or solution and is circulated from the tank to the coil 49 by operation of a pump 54 driven by a suitable motor (not shown). The rate of flow of fluid is regulated by a control valve 55 in accordance with the temperature in the enclosure as determined by a thermal element or feeler bulb 56. Air is circulated over the coil 49 and through the enclosure in any suitable manner in accordance with the usual practice. The liquid in the tank 51 is arranged to be heated or cooled as desired, a heating coil 57 being arranged in the tank and supplied with heating fluid from a heating unit indicated at 58. In a similar manner a cooling coil 59 is arranged in the tank and is supplied with refrigerant from a suitable refrigerating unit indicated at 60. Only one of the units 58 and 60 is maintained in operation at a time. Unit 58 is provided with a suitable control 61, and the refrigerating unit 60 is provided with a suitable control 62, these controls being energized by a switch 63 actuated by the control valve mechanism, the control 61 being energized when a movable switch arm 64 engages a lower contact 65 and the cooling control 62 being energized when the switch arm 64 engages an upper contact 66. The details of construction and manner of operation of the controls 61 and 62 to regulate the required temperatures of the coils 57 and 59 form no part of the present invention and may be of any suitable type for the required purposes.

The details of the control valve assembly 55 and the manner in which it operates will be more readily apparent upon a consideration of Fig. 2, which shows the details of construction. As shown in Fig. 2, the mechanism 55 comprises a movable valve 67 arranged in a casing 68 provided with an inlet connection 69 and an outlet connection 70, the inlet and outlet being connected to the tank 51 and supply line 52 respectively, as shown in Fig. 1. The valve 67 is mounted on a rocking arm 71 pivoted at 72 to a base member 73 of the casing 78, leakage of heat transfer fluid from the casing around the arm 71 being prevented by a sealing bellows 74. The arm 71 is arranged to be actuated by a control mechanism comprising a bellows 75 and a bellows 76. The bellows 75 and 76 are provided with calibrating springs 77 and 78 respectively and adjusting nuts 79 and 80 respectively. Bellows 75 and 76 are mounted in a sealed casing 81 and are both subjected to the same pressure. The pressure as indicated in Fig. 1 is determined by the temperature of the control bulb 56, which is in communication with the interior of the casing 81 through a tube or duct 82. In Fig. 2 the valve has been shown in its closed position with the bellows 75 expanded to its full extent. Upon an increase in pressure in the casing 81 the valve 67 is raised from its seat to permit the flow of heat transfer fluid to the casing 68 and hence to the coil 49. When the valve is in the position illustrated the contact arm 64, which is mounted on a rod 83 secured to a disk 84 of the bellows 76, is in its uppermost position, so that it engages the contact 66 and maintains the cooling unit 60 in operation. Thus, on an increase in pressure in the casing 81 the cooling unit is maintained in operation and the flow of cooled heat transfer medium continues to the coil 49 under control of the valve 67. Upon a decrease in pressure in the casing 81, which occurs upon a reduction of the temperature within the enclosure 50 below a predetermined value representing the beginning of the range of heating temperatures, the bellows 76 expands extending the spring 78 and bringing the switch arm 64 into engagement with the contact 65 to start the heating unit. Upon further expansion the bellows 76 expands and the spring 78 overcomes the spring 77 and opens the valve 67 to effect operation of the valve to open upon a predetermined decrease in temperature. The variations in temperature within the heating range effect corresponding expansions and contractions of the bellows 76 and vary the opening of the valve 67 to control the supply of heating fluid to the coil 49 in accordance with the condition in the enclosure 50 as determined by the temperature feeler 56. It will thus be apparent that the valve 55 provides an effective control of a heating and cooling system so that within the cooling range the valve is opened to provide a greater flow of cooling fluid upon an increase in temperature, and during the heating range the valve is opened to provide an increase in the flow of heating fluid upon a decrease in temperature. Furthermore, the arrangement of the control switch 63 cooperates with the bellows control of the valve to insure the supply of heating medium during the heating range and cooling medium during the cooling range, thus avoiding the danger, for example, of supplying a greater amount of heating fluid upon a demand for cooling.

In heating and cooling systems there is a range of temperatures between the normal heating range and normal cooling range during which it is not necessary to provide a flow of heat transfer medium. It will be noted that in the control valve 55 there is a period before the bellows 76 has expanded to engage the lower bellows, and between the time of closing of the valve 67 in the cooling range and the opening for the heating range, during which the valve is not affected; this provides the inactive period between the two ranges of temperatures.

It will thus be apparent that I have provided a valve and control system which may be employed effectively to control the flow of a heat transfer medium within two different ranges of conditions, for example, within two different temperature ranges. Although I have illustrated my invention as embodied in a heating and cooling system, other applications and modifications will occur to those skilled in the art. I do not, therefore, desire my invention to be limited to the particular constructions illustrated and described, and I intend by the accompanying claims to cover all modifications which fall within the spirit and scope of my invention.

What I claim as new and desire to secure by Letters Patent of the United States is:

1. An apparatus for controlling the flow of fluid in heat exchange with a zone to be conditioned in accordance with variations in the temperature of the zone comprising a valve body having an inlet and an outlet arranged in the path of the fluid to be controlled, means for conducting the fluid from said outlet into heat exchange relationship with said zone, a valve for controlling the passage of fluid from said inlet to said outlet, first and second pressure responsive devices, means for subjecting both said devices to the same pressure and for varying said pressure in accordance with the temperature in said zone, means connecting said first device with said valve to open said valve when the pressure on said devices exceeds a predetermined value, said first device including means biasing said first device to its valve closing position and said second device including means urging said second device toward said first device in opposing relation to said biasing means, said second device being operative at a predetermined low value of the pressure on said devices to overcome said first device and open said valve whereby said valve is opened upon an increase in temperature in one range of operation and upon a decrease in temperature in a second range of operation, means for supplying heating fluid and cooling fluid selectively to said inlet, and means for actuating said last mentioned means to supply cooling fluid during said first range of operation and heating fluid during said second range of operation.

2. An apparatus for controlling the temperature of a zone to be conditioned comprising a valve body having an inlet and an outlet, means for supplying heating fluid and cooling fluid selectively to said inlet and for conducting the fluid from said outlet into heat exchange relationship with the zone to be conditioned for affecting the temperature to be controlled, a valve for controlling the flow of fluid from said inlet to said outlet, first and second pressure responsive devices, means for varying simultaneously the pressure on both said devices in accordance with the temperature of said zone, means connecting said first device with said valve to open said valve when the pressure on said device exceeds a predetermined value, said first device including means biasing said first device to its valve closing position, said second device including means urging said second device toward said first device in opposing relation to said biasing means, said second device being operative at a predetermined low value of the pressure on said devices to overcome the force of said first device and open said valve, and means controlled by said second device for actuating said fluid supplying means to supply cooling fluid to said inlet when said first device is conditioned to open said valve and for supplying heating fluid to said inlet when said second device is conditioned to open said valve.

WARREN A. SPOFFORD.

REFERENCES CITED

The following references are of record in the file of this patent:

UNITED STATES PATENTS

| Number | Name | Date |
|---|---|---|
| Re. 22,685 | Carrier | Oct. 30, 1945 |
| 2,211,672 | Reeder | Aug. 13, 1940 |
| 2,387,793 | Holmes | Oct. 30, 1945 |
| 2,470,503 | Levine | May 17, 1949 |